United States Patent
Gautam et al.

(10) Patent No.: US 10,533,452 B2
(45) Date of Patent: Jan. 14, 2020

(54) ACOUSTIC DAMPER WITH BARRIER MEMBER CONFIGURED TO DAMPEN ACOUSTIC ENERGY PROPOGATING UPSTREAM IN GAS FLOW

(71) Applicant: HONEYWELL INTERNATIONAL INC., Morris Plains, NJ (US)

(72) Inventors: Bhushan Singh Gautam, Bangalore (IN); Gladys Gaude, Girmont (FR)

(73) Assignee: GARRETT TRANSPORTATION I INC., Torrance, CA (US)

( * ) Notice: Subject to any disclaimer, the term of this patent is extended or adjusted under 35 U.S.C. 154(b) by 240 days.

(21) Appl. No.: 15/653,721

(22) Filed: Jul. 19, 2017

(65) Prior Publication Data

US 2019/0024534 A1  Jan. 24, 2019

(51) Int. Cl.
*F02D 25/04* (2006.01)
*F01D 5/26* (2006.01)
(Continued)

(52) U.S. Cl.
CPC ............... *F01D 25/04* (2013.01); *F01D 5/26* (2013.01); *F02C 7/045* (2013.01); *F02C 7/24* (2013.01); *F23R 3/34* (2013.01); *F23R 3/42* (2013.01)

(58) Field of Classification Search
CPC .......... F01D 25/04; F01D 25/06; F02B 37/00; F02B 29/04; F02C 7/045; F02C 7/24; F02M 35/1211; F02M 35/1244; F02M 35/1261; F02M 35/1266; F02M 35/1272; F02M 35/1277; F02M 35/1288; F23R 3/34;
(Continued)

(56) References Cited

U.S. PATENT DOCUMENTS 2,438,426 A * 3/1948 Whittle ................. F04D 17/105
                                                    415/191
2,567,568 A * 9/1951 Lievense ............... F01N 1/089
                                                    181/272

(Continued)

FOREIGN PATENT DOCUMENTS

DE         10112764 A1    9/2002
DE    102004028016 A1 * 12/2005 ............. F02M 25/08
(Continued)

OTHER PUBLICATIONS

Gautam, Bhushan Singh, et al. Acoustic Damper with Resonator Members Arranged In-Parallel; Filed on Feb. 14, 2017 and assigned U.S. Appl. No. 15/431,798.

(Continued)

*Primary Examiner* — Thai Ba Trieu
(74) *Attorney, Agent, or Firm* — Lorenz & Kopf, LLP

(57) ABSTRACT

An acoustic damper includes a housing with an inlet aperture and an outlet aperture. The housing is configured to receive a gas flow that enters via the inlet aperture and that exits via the outlet aperture. The acoustic damper also includes a barrier member that is disposed within the housing. The barrier member is configured to be disposed within the gas flow and to dampen acoustic energy that propagates in an upstream direction generally from the outlet aperture toward the inlet aperture. The barrier member includes an outer structure that defines an interior volume of the barrier member. The interior volume is oriented toward the outlet aperture.

20 Claims, 6 Drawing Sheets

(51) Int. Cl.
*F01D 25/04* (2006.01)
*F02C 7/045* (2006.01)
*F02C 7/24* (2006.01)
*F23R 3/34* (2006.01)
*F23R 3/42* (2006.01)

(58) Field of Classification Search
CPC ........ F23R 3/42; F04D 29/663; F04D 29/664; F04D 29/668
USPC ........ 60/605.1; 415/119; 181/229, 257, 272, 181/276, 265
See application file for complete search history.

(56) References Cited

U.S. PATENT DOCUMENTS

| | | | |
|---|---|---|---|
| 2,720,935 A | | 10/1955 | Lysholm et al. |
| 2,764,142 A | * | 9/1956 | McMullen ......... F02M 35/1233 181/229 |
| 2,789,662 A | * | 4/1957 | McMullen ......... F02M 35/1266 181/229 |
| 3,120,876 A | | 2/1964 | Lirette |
| 3,819,319 A | * | 6/1974 | Schreter ................ F23D 11/00 431/114 |
| 4,091,892 A | * | 5/1978 | Hehmann ............... F02K 1/827 181/212 |
| 4,204,586 A | * | 5/1980 | Hani .................. F02M 35/1211 181/229 |
| 4,667,769 A | * | 5/1987 | Appel ................ F02M 35/1211 181/229 |
| 4,969,536 A | | 11/1990 | Allen |
| 5,413,189 A | * | 5/1995 | Browning ................ F01N 1/08 181/275 |
| 5,417,727 A | * | 5/1995 | Bowen ............... F02M 35/1216 181/229 |
| 5,659,158 A | * | 8/1997 | Browning ................ F01N 1/08 181/275 |
| 6,537,490 B2 | * | 3/2003 | Han ...................... F04D 29/664 415/119 |
| 6,582,188 B2 | * | 6/2003 | Rippl .................. F04D 29/4213 415/119 |
| 6,672,424 B2 | * | 1/2004 | Gadefait ................. F02K 1/827 181/256 |
| 6,736,238 B2 | * | 5/2004 | Kerr ..................... F04D 29/663 181/275 |
| 6,802,388 B2 | * | 10/2004 | Wolf .................. F02M 35/1266 181/265 |
| 6,983,820 B2 | | 1/2006 | Boast et al. |
| 7,029,244 B2 | * | 4/2006 | Anderson ............... F04D 25/02 417/362 |
| 7,584,821 B2 | * | 9/2009 | Prior .................. F02M 35/1261 181/276 |
| 7,794,213 B2 | | 9/2010 | Gaude et al. |
| 8,197,188 B2 | * | 6/2012 | Clay ...................... F04D 25/04 415/119 |
| 8,381,871 B1 | * | 2/2013 | Hellie ................ F02M 35/1238 181/276 |
| 8,651,800 B2 | * | 2/2014 | Li .................... F02M 35/10157 415/119 |
| 8,690,524 B2 | | 4/2014 | Yin et al. |
| 8,950,183 B2 | * | 2/2015 | Nixon ................ F02M 35/10157 415/116 |
| 9,188,342 B2 | * | 11/2015 | Melton .................... F23R 3/286 |
| 9,228,549 B2 | * | 1/2016 | Feld .................. F02M 35/1272 |
| 9,309,842 B2 | * | 4/2016 | Watson .................. F02M 35/12 |
| 2004/0146396 A1 | * | 7/2004 | Liu ....................... F04D 29/665 415/119 |
| 2014/0133964 A1 | * | 5/2014 | Ayle ........................ F02C 7/24 415/119 |
| 2014/0219781 A1 | * | 8/2014 | Watson .................. F02M 35/12 415/119 |
| 2015/0041247 A1 | * | 2/2015 | Ichihashi ................ F02C 7/045 181/292 |
| 2015/0041248 A1 | * | 2/2015 | Ichihashi ................ F02C 7/045 181/292 |
| 2015/0068481 A1 | * | 3/2015 | McCure ............. F02M 35/1211 123/184.21 |
| 2015/0107935 A1 | * | 4/2015 | Dobrin ............... F02M 35/1261 181/214 |
| 2016/0146220 A1 | * | 5/2016 | Chaggar ............... F04D 29/624 415/119 |
| 2016/0258447 A1 | * | 9/2016 | Day ...................... F04D 29/685 |

FOREIGN PATENT DOCUMENTS

| | | | | |
|---|---|---|---|---|
| DE | 202013011555 U1 | * | 2/2014 | ........ F02M 35/1216 |
| EP | 0573895 A1 | | 12/1993 | |
| EP | 1176355 A2 | * | 1/2002 | ........ F02M 35/1266 |
| EP | 1260697 A2 | | 11/2002 | |
| EP | 1830071 A2 | | 9/2007 | |
| EP | 1851444 B1 | | 1/2011 | |
| GB | 811612 A | | 4/1959 | |

OTHER PUBLICATIONS

European Patent and Trademark Office, European Search Report for Application No. 18172771.0, dated Dec. 13, 2018.

* cited by examiner

ACOUSTIC DAMPER WITH BARRIER MEMBER CONFIGURED TO DAMPEN ACOUSTIC ENERGY PROPOGATING UPSTREAM IN GAS FLOW

TECHNICAL FIELD

The present disclosure generally relates to an acoustic damper and, more particularly, to an acoustic damper with a barrier member configured to dampen acoustic energy propagating upstream in a gas flow through the damper.

BACKGROUND

Some devices include one or more acoustic dampers for reducing undesirable noise during operation. For example, in a vehicle engine system, operation of a turbocharger may create audible pulsation or hiss. Therefore, an acoustic damper may be included to reduce the noise.

In many cases, the acoustic damper may take up a substantial amount of space. Thus, it may be difficult to fit the acoustic damper within the system. Also, reducing the size of the acoustic damper can decrease its noise-reducing effectiveness.

Additionally, some acoustic dampers may be effective for reducing noise at one frequency. However, the same damper may not be effective for reducing noise at another. Accordingly, the acoustic damper may be of limited usefulness.

Thus, it is desirable to provide an engine system with a compact acoustic damper that effectively reduces noise across a range frequencies. Other desirable features and characteristics of the present disclosure will become apparent from the subsequent detailed description and the appended claims, taken in conjunction with the accompanying drawings and this background discussion.

BRIEF SUMMARY

In one embodiment, an acoustic damper is disclosed that includes a housing with an inlet aperture and an outlet aperture. The housing is configured to receive a gas flow that enters via the inlet aperture and that exits via the outlet aperture. The acoustic damper also includes a barrier member that is disposed within the housing. The barrier member is configured to be disposed within the gas flow and to dampen acoustic energy that propagates in an upstream direction generally from the outlet aperture toward the inlet aperture. The barrier member includes an outer structure that defines an interior volume of the barrier member. The interior volume is oriented toward the outlet aperture.

In another embodiment, an acoustic damper is disclosed that includes a housing with an inlet aperture and an outlet aperture. The housing is configured to receive a gas flow that enters via the inlet aperture and that exits via the outlet aperture. The acoustic damper also includes a barrier member that is disposed within the housing and configured to be disposed within the gas flow. The barrier member includes an upstream end, a downstream end, and an axis that extends between the upstream end and the downstream end. The barrier member has an outer width measured perpendicular to the axis. The outer width gradually increases from the upstream end to the downstream end along the axis. The barrier member defines an interior volume. The downstream end includes an opening into the interior volume. The acoustic damper further includes at least one resonator that is supported by the barrier member within the interior volume.

In an additional embodiment, a vehicle engine system is disclosed that includes a turbocharger with an air inlet to a compressor. The engine system also includes an acoustic damper that is operably attached to the air inlet of the turbocharger. The acoustic damper includes a housing with an upstream wall with an inlet aperture and a downstream wall with an outlet aperture. The outlet aperture is fluidly connected to the air inlet of the turbocharger. The housing includes an outer radial wall that extends between the upstream wall and the downstream wall. The housing has a substantially straight axis that extends between the inlet aperture and the downstream aperture. The housing is configured to receive a gas flow that enters via the inlet aperture and that exits via the outlet aperture. The acoustic damper also includes a plurality of outer resonators that are attached to the upstream wall. The outer resonators are cylindrical and hollow and are substantially coaxial with the axis. The outer resonators have different lengths. The acoustic damper additionally includes a barrier member that is disposed within the housing. The barrier member includes an outer shell that defines an upstream end, a downstream end, and an interior volume of the barrier member. The barrier member is substantially symmetric about the axis. The outer shell has an outer width measured perpendicular to the axis. At least a portion of the outer shell has the outer width gradually increasing in a downstream direction from the upstream end to the downstream end. The barrier member is oriented within the housing with the interior volume oriented toward the outlet aperture. The acoustic damper further includes at least one resonator disposed within the interior volume of the barrier member.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an acoustic damper with improved acoustic dampening characteristics. In particular, example embodiments include an acoustic damper with a housing through which a gas flow (e.g., an airflow) may pass. The damper may also include a barrier member (e.g., a sound-capturing cup) that is disposed within the flow stream of the housing to capture and attenuate acoustic energy directed from a noise source, and to reduce further transmission of the noise.

The barrier member may include an internal volume that is open in at least one direction. The internal volume may be open generally toward an outlet of the housing. Accordingly, acoustic energy that propagates in an upstream direction from the outlet may be attenuated by the barrier member.

The damper may include various features that help to attenuate acoustic energy, that improve manufacturability, and/or provide other benefits. For example, the shape of the barrier member may be configured for improved dampening performance. Also, the damper may include one or more damping features, such as resonators, acoustic damping materials, and the like. Moreover, the housing may include damping members, such as resonators, acoustic damping materials, etc. The barrier member and the housing may be arranged together to dampen acoustic energy in tandem. Also, the pressure drop across the damper may be relatively low.

Figure 1:
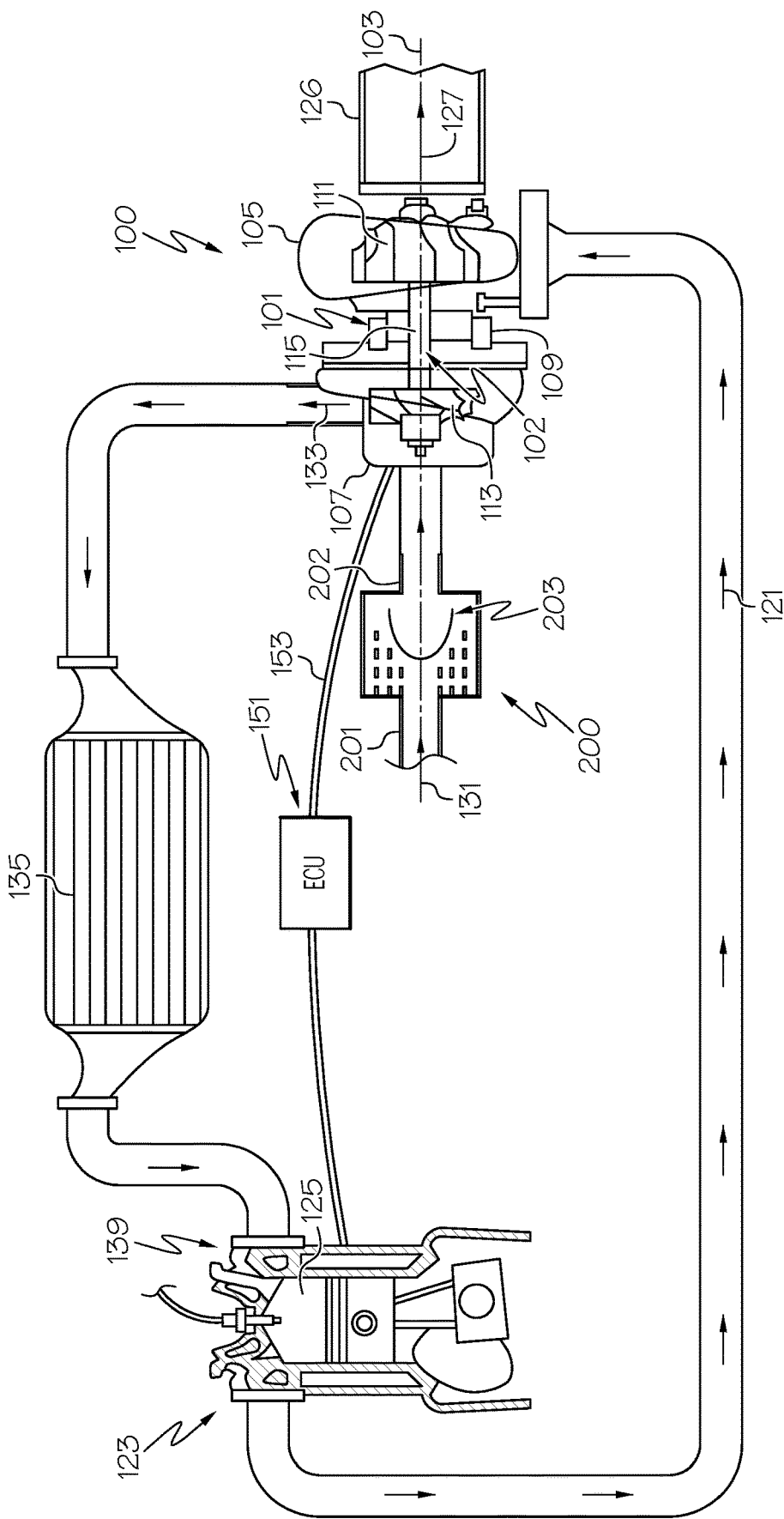
FIG. 1 is a schematic view of a vehicle engine system, which includes an acoustic damper according to example embodiments of the present disclosure.

FIG. 1 is a schematic view of an example turbocharger 100 that includes a turbocharger housing 101 and a rotor 102. The rotor 102 is configured to rotate within the turbocharger housing 101 about an axis of rotor rotation 103. The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis of rotation 103, through the bearing housing 109, to connect the turbine wheel 111 to the compressor wheel 113. Accordingly, the turbine wheel 111 and the compressor wheel 113 rotate together about the axis 103.

The turbine housing 105 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 (and thus the rotor 102) is driven in rotation around the axis 103 by the high-pressure and high-temperature exhaust gas stream 121, which becomes a lower-pressure and lower-temperature exhaust gas stream 127 that is released into a downstream exhaust pipe 126. In other embodiments, the engine 125 may be of another type, such as a diesel fueled engine.

The compressor housing 107 and compressor wheel 113 form a compressor (i.e., compressor section, compressor stage). The compressor wheel 113, being driven in rotation by the exhaust-gas driven turbine wheel 111, is configured to compress an intake airstream 131 (e.g., ambient air, or already-pressurized air from a previous-stage in a multi-stage compressor) into a pressurized air stream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the intake airstream 131.

The pressurized air stream 133 may be channeled through an air cooler 135 (i.e., intercooler), such as a convectively cooled charge air cooler. The air cooler 135 may be configured to dissipate heat from the pressurized air stream 133, increasing its density. The resulting cooled and pressurized air stream 133 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

In some embodiments, the flow of intake airstream 131 may be channeled through an acoustic damper 200. Specifically, as shown in FIG. 1, an inlet pipe 201 may extend into the damper 200, and an outlet pipe 202 may extend between an outlet of the acoustic damper 200 and the compressor housing 107. Accordingly, the intake airstream 131 may flow through the damper 200 and into the compressor housing 107 to be compressed by the wheel 113 and enter the pressurized air stream 133.

The acoustic damper 200 may include features that attenuate acoustic energy across a broad range of frequencies. In some embodiments, the damper 200 may attenuate acoustic energy that propagates (flows, travels, etc.) generally in an upstream direction from the outlet pipe 202 toward the inlet pipe 201. For example, operation of the turbocharger 100 may cause flow-generated noise, such as Compressor Blade Passing Frequency (CBPF) noise. The turbocharger 100 may also generate hiss or other types of flow-generated noise. However, the damper 200 of the present disclosure may attenuate this noise. Furthermore, the damper 200 may be relatively compact and, yet, effective at attenuating the acoustic energy.

It will be appreciated that the acoustic damper 200 may be located, positioned, and arranged differently within the system of FIG. 1 or within another system of a vehicle. For example, in additional embodiments, the acoustic damper 200 may be integrated within the compressor housing 107. For example, a portion of the acoustic damper 200 may be integrally connected to a portion of the compressor housing 107 such that the portions collectively define a unitary, one-piece member (and such that the outlet pipe 202 is omitted). Additionally, the acoustic damper 200 may be disposed at any location, either upstream of the compressor inlet or downstream of the compressor outlet. Also, in some embodiments, the acoustic damper 200 may be arranged upstream of the turbine inlet (i.e., to receive the exhaust gas stream 121), or the acoustic damper 200 may be arranged downstream of the turbine outlet (i.e., to receive the exhaust gas stream 127). Moreover, it will be appreciated that FIG. 1 schematically illustrates the acoustic damper 200, the turbocharger 100, the IC engine 125, and other components; therefore, these components are not necessarily drawn to scale.

Additionally, it will be appreciated that the acoustic damper 200 may be incorporated within a system other than an engine system and/or other than a turbocharger system.

For example, the acoustic damper 200 may be incorporated within another system through which a fluid (e.g., air or other gas) flows without departing from the scope of the present disclosure.

Figure 2:
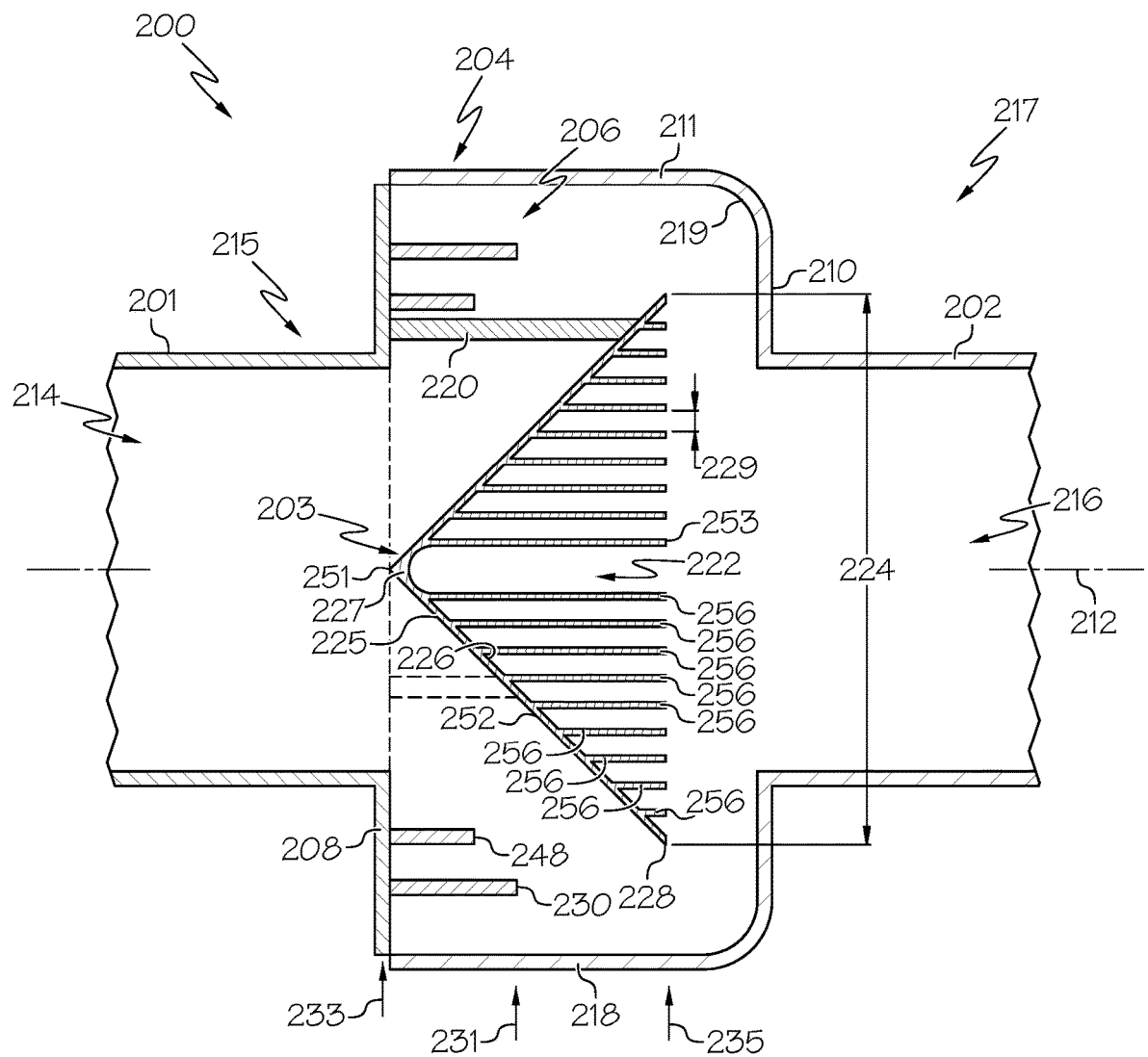
FIG. 2 is a longitudinal section view of the acoustic damper of FIG. 1.
Figure 3:
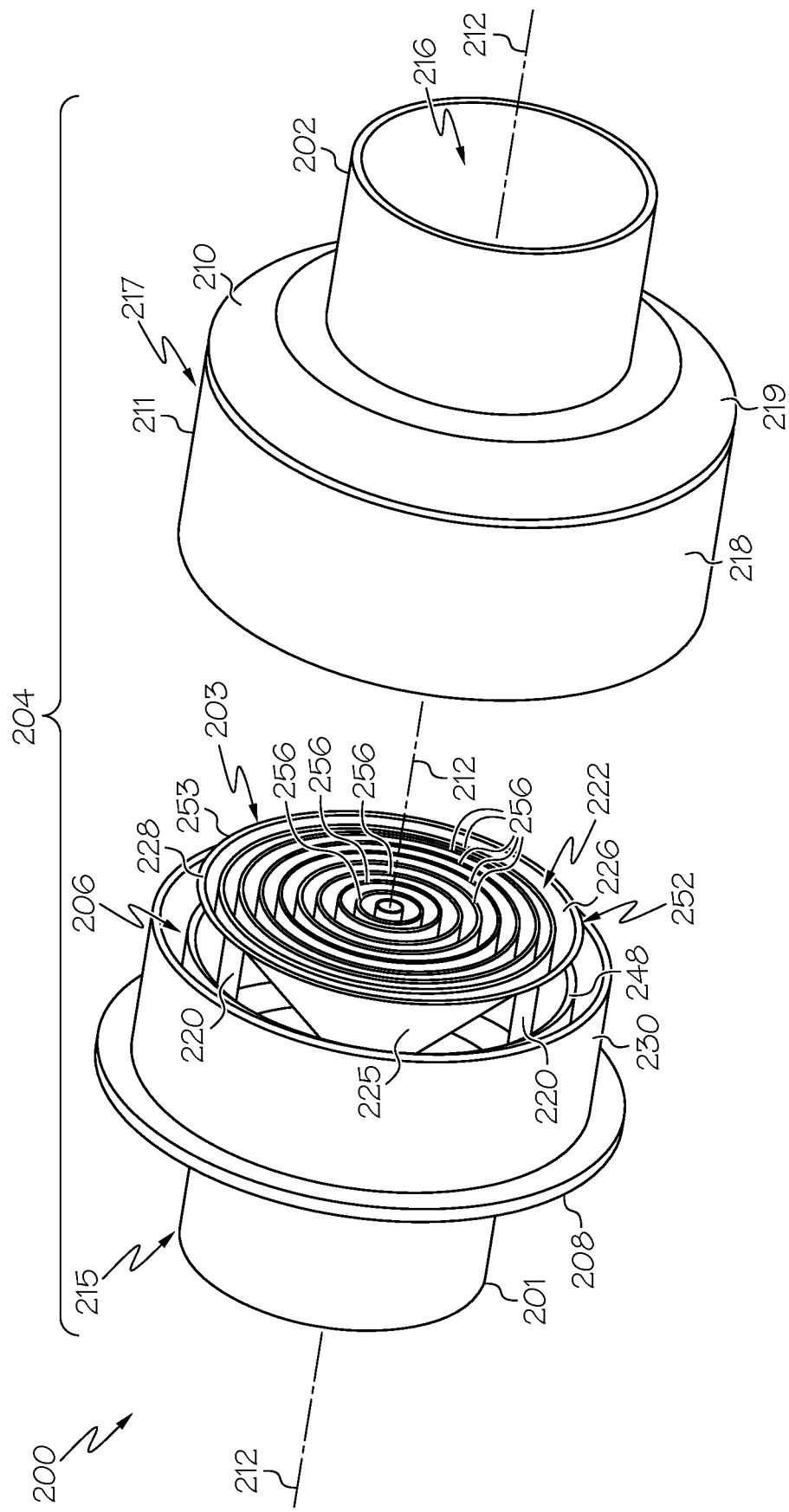
FIG. 3 is an exploded perspective view of the acoustic damper of FIG. 2.

Referring now to FIGS. 2 and 3, the acoustic damper 200 is shown according to example embodiments. In some embodiments, the damper 200 may include one or more features disclosed in U.S. patent application Ser. No. 15/431, 798, filed on Feb. 14, 2017, entitled ACOUSTIC DAMPER WITH RESONATOR MEMBERS ARRANGED IN-PARALLEL, and which is incorporated by reference in its entirety.

The damper 200 may generally include a housing 204 and a barrier member 203. The housing 204 may define an inlet aperture 214 and an outlet aperture 216, which permit gas flow through the damper 200. The barrier member 203 may be configured to dampen acoustic energy associated with operation of the system.

As shown, the housing 204 may include an upstream wall 208, a downstream wall 210, and an outer radial wall 211. The upstream wall 208 may include the inlet aperture 214, and the downstream wall 210 may include the outlet aperture 216. The outer radial wall 211 may extend between and may be attached at both ends to the upstream wall 208 and the downstream wall 210. The upstream wall 208, the downstream wall 210 and the outer radial wall 211 may relatively thin-walled members. In some embodiments, the outer radial wall 211 may be hollow and cylindrical with a circular cross section (e.g., a right circular hollow cylinder).

The inlet pipe 201 may be attached to the upstream wall 208. The inlet pipe 201 may be in fluid communication with the inlet aperture 214 such that the inlet pipe 201 can deliver the intake airstream 131 (FIG. 1) into the damper 200. The outlet pipe 202 may be attached to the downstream wall 210. The outlet pipe 202 may be in fluid communication with the outlet aperture 216 for outputting the airstream 131 from the damper 200 to the compressor housing 107.

As shown in FIG. 3, the housing 204 may be collectively defined by multiple portions, such as a first portion 215 and a second portion 217. The first portion 215 may include the upstream wall 208. The second portion 217 may include the outer radial wall 211 and the downstream wall 210. The second portion 217 may also include a radius 219 at the transition between the outer radial wall 211 and the downstream wall 210. As shown in FIG. 2, the upstream terminal end, or rim, of the outer radial wall 211 may be attached to the periphery of the upstream wall 208 to connect the first portion 215 and the second portion 217. In some embodiments, the outer radial wall 211 may be integrally connected to be monolithic with the downstream wall 210. Also, the outer radial wall 211 may be welded to the upstream wall 208, attached by fasteners, or otherwise attached.

The acoustic damper 200 may further include a plurality of resonators 206 (i.e., outer resonators), such as a first resonator 218, a second resonator 230, and a third resonator 248. The first, second, and third resonators 218, 230, 248 may be configured for attenuating acoustic energy. The first, second, and/or third resonator 218, 230, 248 may be substantially cylindrical and hollow in some embodiments.

The first resonator 218 may be defined by the outer radial wall 211. Accordingly, the first resonator 218 may extend between the upstream wall 208 and the downstream wall 210. Also, the first resonator 218 may be integrally attached to the downstream wall 210 in some embodiments to be unitary therewith.

The second resonator 230 may be surrounded by the first resonator 218. The third resonator 248 may be surrounded by the second resonator 230. The second resonator 230 and the third resonator 248 may be attached to the upstream wall 208. Also, the second resonator 230 and the third resonator 248 may be spaced apart from the downstream wall 210. In other words, as shown in FIG. 2, the second and third resonators 230, 248 may be each attached to the upstream wall 208, may extend therefrom along a longitudinal axis 212 of the damper 200, and may terminate in a space between the upstream wall 208 and the downstream wall 210. The third resonator 248 may be shorter than the second resonator 230, and the second resonator 230 may be shorter than the first resonator 218.

As shown in FIGS. 2 and 3, the resonators 218, 230, 248 may be substantially coaxial with each other. Also, the resonators 218, 230, 248 may be centered on the axis 212, along with the inlet pipe 201, the inlet aperture 214, the outlet pipe 202, and the outlet aperture 216.

The damper 200 may additionally include at least one support structure 220 that attaches the barrier member 203 to the housing 204. In some embodiments, the support structure 220 includes a plurality of elongate members, such as rods, bars, pins, etc. The support structures 220 may extend along the longitudinal axis 212, but may be spaced therefrom. Also, the support structures 220 may be spaced circumferentially about the axis 212. In some embodiments, there may be three support structures 220. The support structures 220 may be attached at one end to the upstream wall 208, may extend along the axis 212 from the upstream wall 208, and may be attached at the opposite end to the barrier member 203.

The barrier member 203 will now be discussed according to example embodiments. At least part of the barrier member 203 may be contoured, conical, frusto-conical, cup-shaped, bluff-shaped, hemispherical, etc. The barrier member 203 may be exposed to the gas flow within the damper 200. For example, the barrier member 203 may be disposed proximate the axis 212 (e.g., substantially centered on the axis). Also, the barrier member 203 may be substantially hollow and open-ended. The interior of the barrier member may be directed toward the outlet aperture 216 of the damper 200.

The barrier member 203 may include an outer shell 252 (i.e., an outer structure). The outer shell 252 may define an upstream end 251 of the barrier member 203 and at least part of a downstream end 253 of the barrier member 203. Also, the outer shell 252 may be continuous and uninterrupted (i.e., without holes or other apertures) between the upstream end 251 and the downstream end 253. The outer shell 252 may also include an exterior surface 225 and an interior surface 226. The outer shell 252 may have a relatively small wall thickness measured between the exterior and interior surfaces 225, 226.

The outer shell 252 may be hollow. As such, the interior surface 226 of the outer shell 252 may at least partly define an interior volume 222 of the barrier member 203. Also, the downstream end 253 may define an opening into the interior volume 222.

As shown in FIG. 2, the outer shell 252 may have a width 224 (i.e., an outer width of the barrier member 203) that is measured perpendicular to the axis 212. In some embodiments, the width 224 may be a diameter of a circular cross section of the outer shell 252. The width 224 of the outer shell 252 may change along its axial length. Generally, the upstream end 251 may be narrower than the downstream end 253, and the width 224 may increase gradually along the axis 212 from the upstream end 251 to the downstream end 253. Thus, the outer shell 252 may taper along its length. In some embodiments, the width 224 proximate the downstream end 253 may be larger than the width (e.g., diameter) of the inlet aperture 214 and/or the width of the outlet aperture 216.

In some embodiments, the outer shell 252 may be substantially conic or frusto-conic in shape. In some embodiments, the outer shell 252 may substantially resemble a right cylinder cone. Accordingly, the outer shell 252 may include a pointed or rounded tip 227 at the upstream end 251 and a circular lip 228 at the downstream end 253.

The outer shell 252 may be supported within the housing 204 via the support structures 220. In some embodiments, the outer shell 252 may be substantially centered and symmetrical about the axis 212 with the axis 212 intersecting the tip 227 of the outer shell 252 and centered with respect to the downstream lip 228. Accordingly, the outer shell 252 (and the interior volume 222 therein) may be substantially coaxial with the inlet aperture 214 and the outlet aperture 216. The outer shell 252 may also be spaced apart from the housing 204 in both the longitudinal direction and in the radial direction. Furthermore, the outer shell 252 may be spaced apart from the terminal ends of the second and third resonators 230, 248. Also, the exterior surface 225 may face generally upstream toward the inlet pipe 201, the inlet aperture 214, and the upstream wall 208. Conversely, the interior volume 222 may be oriented generally downstream toward the outlet pipe 202 and the outlet aperture 216.

Moreover, the barrier member 203 may include one or more acoustic dampening features. For example, as shown in FIGS. 2 and 3, the barrier member 203 may contain a plurality of internal resonators 256 (i.e., quarter wave resonators). The internal resonators 256 may be cylindrical and hollow. The internal resonators 256 may be fixed on one end to the internal surface 226 of the outer shell 252, and the resonators 256 may be coaxial and centered on the axis 212. Also, the free end of at least some of the resonators 256 may terminate substantially in the same radial plane as the downstream lip 228 of the outer shell 252. Also, the barrier member 203 may be arranged such that, as the radii of the resonators 256 increase, the axial lengths of the resonators 256 decrease. Moreover, the resonator 256 with the smallest radius may be disposed proximate the axis 212, and the resonator 256 with the next largest radius may surround the first, and so on. Additionally, there may be a substantially consistent radial distance 229 between adjacent resonators 256. Accordingly, the resonators 256 may be arranged in-parallel within the interior volume 222. Also, the open ends of the resonators 256 may be oriented downstream generally toward the outlet pipe 202 and the outlet aperture 216.

Furthermore, in some embodiments, the damper 200 may provide a flow profile that maintains a relatively low pressure drop from the inlet pipe 201 to the outlet pipe 202. This may be due to the varying cross sectional area within the damper 200 for fluid flow between the outer housing 204 and the barrier member 203. For example, in FIG. 2, three cross areas are indicated at 231, 233, and 235. Each area 231, 233, 235 has a different cross sectional area for fluid flow. The first area 231 is indicated approximately midway along the axis 212 of the damper 200 and a cross section at this area 231 includes the outer housing 204, the barrier member 203, portions of the second resonator 230, and the support structures 220. A second area 235 is indicated proximate the downstream end 253 of the barrier member 203. An inlet area 233 is taken at the inlet aperture 214. In some embodiments, the cross sectional area for fluid flow at 231 may be at least as large as the cross sectional area at 233. Likewise, the cross sectional area for fluid flow at 233 may be at least as large as the cross sectional area at 233. Stated differently, it will be appreciated that, in the embodiment of FIG. 2, the mathematical area (X) at 231 may be found, for example, by calculating the total cross sectional area at the outer radial wall 211 and subtracting the area occupied by the second resonator 230, the support structures 220, and the barrier member 203. A mathematical area (Y) at 235 may be found by subtracting the area of the barrier member 203 from the area of the outer radial wall 211. The mathematical area (Z) at 233 (Z) is the area of the inlet aperture 214. Thus, in some embodiments, the area at 231 may be at least equal to the area at 233 (X≥Z). Likewise, in some embodiments, the area at 235 may be at least equal to the area at 233 (Y≥Z). Thus, flow through the damper 200 may occur without generating a large pressure drop across the damper 200.

Accordingly, the acoustic damper 200 may effectively attenuate and dampen acoustic energy during operation. The acoustic damper 200 can dampen acoustic energy across a wide band of frequencies. In some embodiments, the interior volume 222 of the barrier member 203 may receive and dampen acoustic energy propagating in the upstream direction, from the outlet aperture 216 toward the inlet aperture 218. Also, as an added benefit, the acoustic damper 200 may be relatively compact and highly manufacturable.

Figure 4:
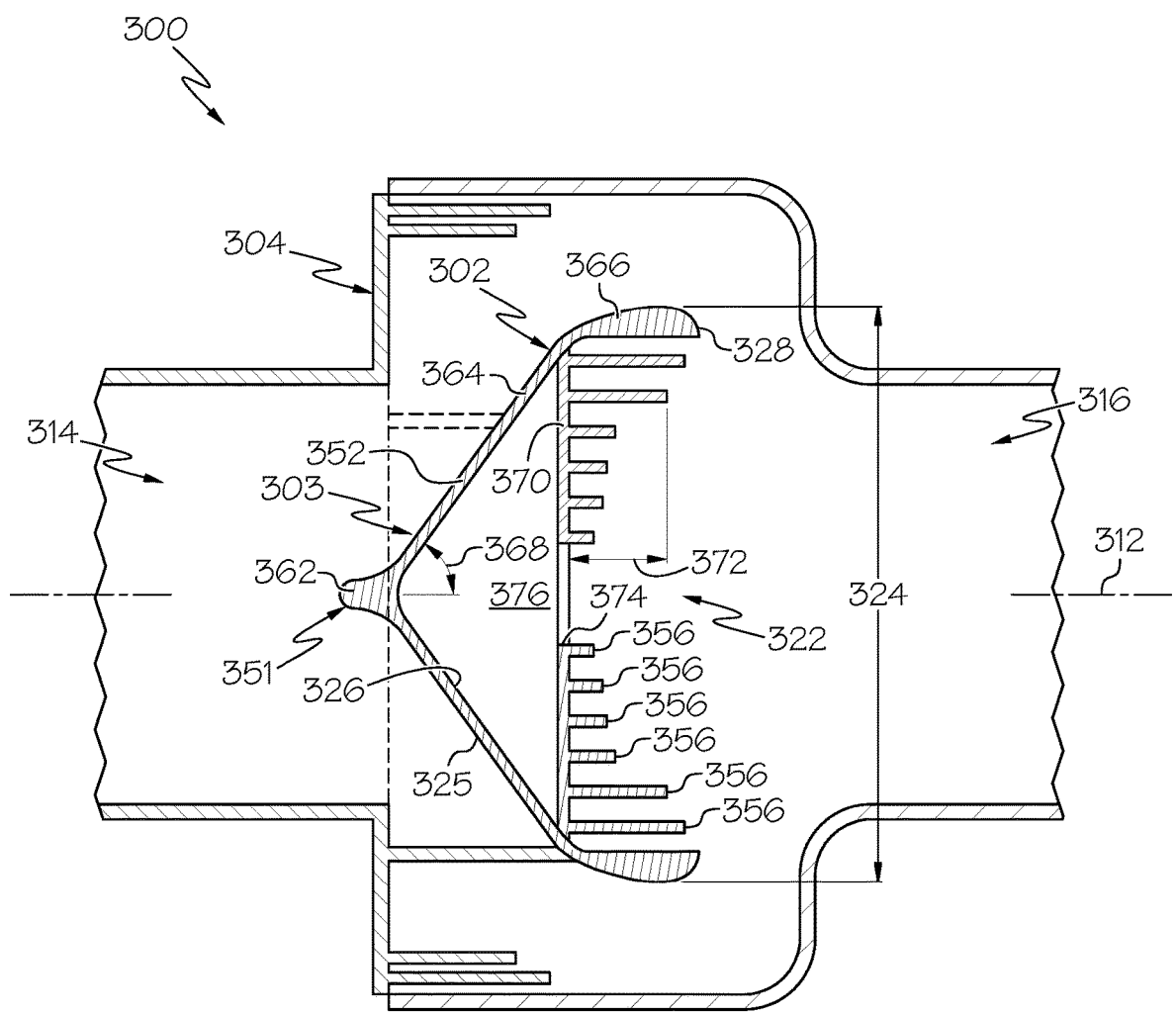
FIG. 4 is a longitudinal section view of the acoustic damper according to additional embodiments of the present disclosure.

Referring now to FIG. 4, the damper 300 is shown according to additional embodiments of the present disclosure. The damper 300 may be substantially similar to the embodiments of FIGS. 2 and 3 (or other embodiments disclosed herein) except as detailed below. Components of the damper 300 that correspond to those of the embodiments of FIGS. 2 and 3 are indicated with corresponding reference numbers increased by 100.

The upstream end 351 of the barrier member 303 may include a projection 362 (e.g., a nipple, a pointed tip, etc.). The projection 362 may project in the upstream direction from the exterior surface 325 along the axis 312 and toward the inlet aperture 314. The projection 362 may be centered on the axis 312 in some embodiments. The projection may improve flow characteristics for the damper 300, directing gas flow in the radial direction about the barrier member 302.

The downstream lip 328 may also be contoured. For example, the downstream lip 328 may contour radially inward toward the axis 312. The curved downstream lip 328 may improve flow characteristics for the damper 300, directing gas flow in the radial direction toward the axis 312 and toward the outlet aperture 316.

Additionally, the width 324 of the outer shell 352 may taper along the axis 312 similar to the embodiment of FIG. 2, except the outer shell 352 may define different segments having a different taper angle 368 (measured between the axis 312 and the outer shell 352). For example, the outer shell 352 may include a first segment 364 and a second segment 366, which have different taper angles 368. Specifically, in some embodiments, the first segment 364 may have a larger taper angle 368 than the second segment 366. The first segment 364 may be disposed upstream relative to the second segment 366. Both the first and second segments 364, 366 may be generally frusto-conic and hollow. Also, the projection 362 may be attached to one axial end of the first segment 364. The second segment 366 may be attached to the other axial end of the first segment 364, and the second segment 366 may include the downstream lip 328.

The barrier member 303 may further include an inner wall 370. The inner wall 370 may extend radially across the internal volume 322 and may be fixedly attached to the internal surface 326 of the outer shell 352. The inner wall 370 may be attached at the transition between the first segment 364 and the second segment 366. The inner wall 370 may also include an internal opening 374. In some embodiments, the internal opening 374 may be a through-hole that is centered on the axis 312.

Additionally, the internal resonators 356 may be attached to the inner wall 370 and may extend in the downstream direction therefrom. The internal resonators 356 may have different lengths 372 from each other. For example, in some embodiments, the internal resonator 356 closest the axis 312 may be the shortest, and the resonator 356 furthest away from the axis 312 may be the longest. The internal resonators 356 may be arranged with the lengths 372 being progressively larger in the radial direction.

Furthermore, a chamber 376 may be defined between the internal surface 326 of the outer shell 352 and the inner wall 370. The internal opening 374 may provide access into the chamber 376. Accordingly, it will be appreciated that the chamber 376 may define a so-called Helmholtz resonator for providing additional dampening of acoustic energy. In the embodiment illustrated, the chamber 376 is empty. Accordingly, the damper 300 may be a purely reactive-type damper.

Figure 5:
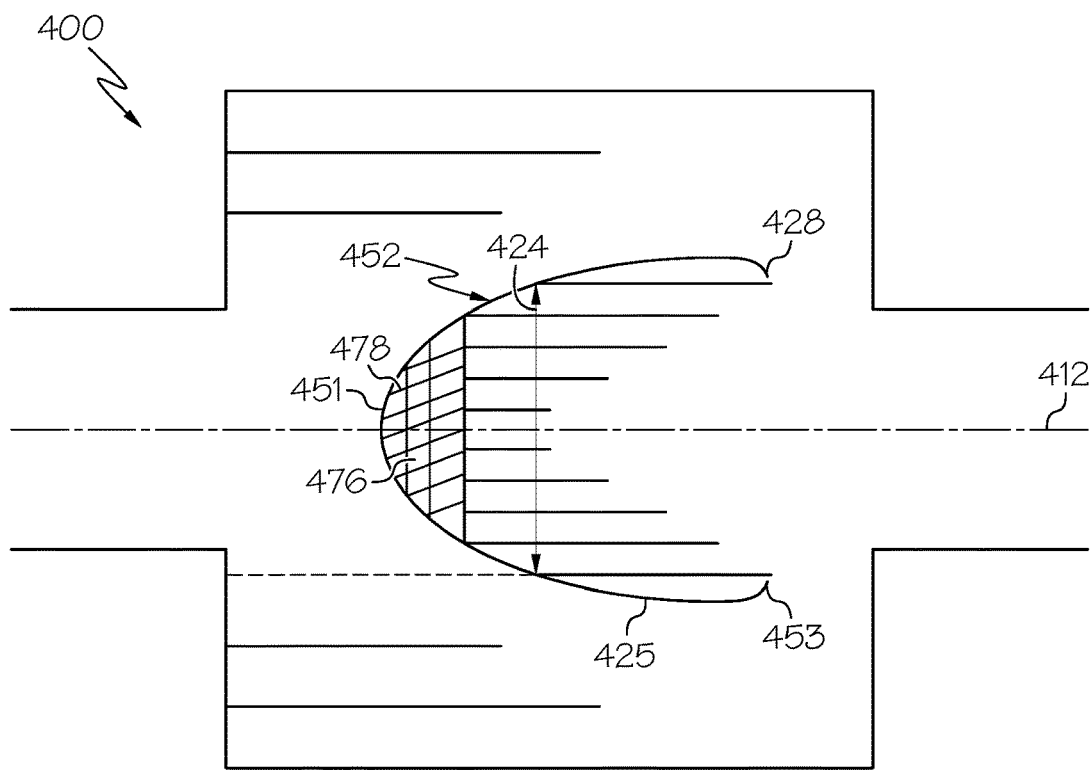
FIG. 5 is a longitudinal section view of the acoustic damper according to additional embodiments of the present disclosure.

Referring now to FIG. 5, the damper 400 is shown according to additional embodiments of the present disclosure. The damper 400 may be substantially similar to the embodiment of FIG. 4 (or other embodiments disclosed herein) except as detailed below. Components of the damper 400 that correspond to those of the embodiments of FIG. 4 are indicated with corresponding reference numbers increased by 100.

As shown in FIG. 5, the outer shell 452 may be shaped and contoured differently than the embodiments discussed above. Specifically, the width 424 may gradually increase from the upstream end 451 to the downstream end 453 to provide contour to the exterior surface 425 of the outer shell 452. Although the curvature of the outer shell 452 is shown in two dimensions in FIG. 5 (i.e., the plane of the page), it will be appreciated that the profile of the outer shell 452 in FIG. 5 may also curve circumferentially about the axis 412. The downstream lip 428 may slightly contour inward in the radial direction, similar to the embodiment of FIG. 4. Accordingly, the outer shell 452 may be substantially ovoid, egg-shaped, bluff-shaped, hemispherical, or otherwise similarly shaped. Furthermore, the chamber 476 may contain an acoustic damping material 478. In some embodiments, the material 478 may include a foam, a textile, or other material that attenuates noise. Accordingly, the damper 400 may be a combination of a reactive-type and a passive-type damper. In additional embodiments, the acoustic damping material 478 may be omitted, and the damper 400 may be configured as an Helmholtz resonator. For example, the damper 400 may include an empty chamber with an opening on at least one surface.

Figure 6:
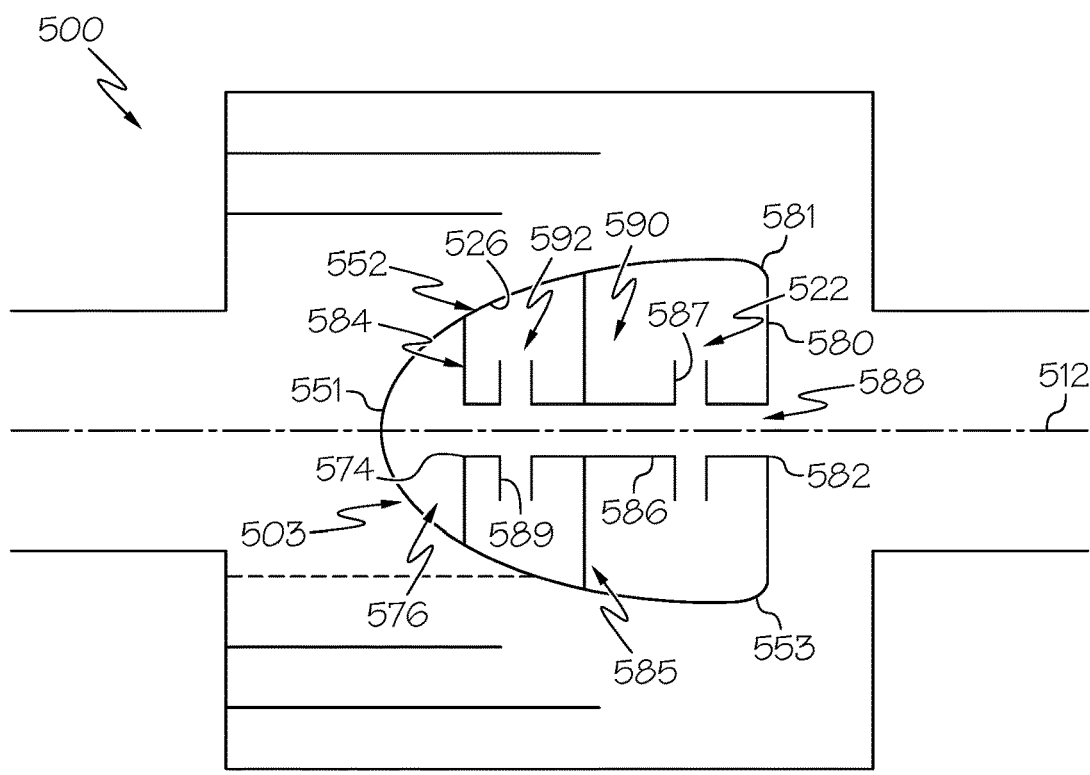
FIG. 6 is a longitudinal section view of the acoustic damper according to additional embodiments of the present disclosure.

Referring now to FIG. 6, the damper 500 is shown according to additional embodiments of the present disclosure. The damper 500 may be substantially similar to the embodiment of FIG. 5 (or other embodiments disclosed herein) except as detailed below. Components of the damper 400 that correspond to those of the embodiments of FIG. 5 are indicated with corresponding reference numbers increased by 100.

As shown, the damper 500 may include a downstream wall 580. The downstream wall 580 may be attached to the outer shell 552 to substantially define the downstream end 553 of the barrier member 503. There may also be a contoured transition 581 between the outer shell 552 and the downstream wall 580.

The downstream wall 580 may define a downstream opening 582. In some embodiments, the downstream opening 582 may be a through-hole extending through the wall 580. The downstream opening 582 may also be coaxial and centered on the axis 512.

Moreover, the damper 500 may include a first inner wall 584. The first inner wall 584 may extend radially across the internal volume 522 and may be fixedly attached to the internal surface 526 of the outer shell 552. The first inner wall 584 may be disposed proximate the upstream end 551. The first inner wall 584 may also include an internal opening 574. In some embodiments, the internal opening 574 may be a through-hole that is centered on the axis 512.

The damper 500 may also include a second inner wall 585. The second inner wall 585 may extend radially across the internal volume 522 and may be fixedly attached to the internal surface 526 of the outer shell 552. The second inner wall 585 may be disposed along the axis 512 between the first inner wall 584 and the downstream wall 580.

The damper 500 may additionally include an internal tube 586. The internal tube 586 may have a straight axis that is centered and aligned with the longitudinal axis 512. The internal tube 586 may also be fixedly attached at one end to the first inner wall 584 and fixedly attached at the opposite end to the downstream wall 580. The tube 586 may also pass through the second inner wall 585 and may be fixedly attached to the second inner wall 585. The tube 586 may include a passage 588 that fluidly connects the downstream opening 582 and the internal opening 574. The tube 586 may also include at least one first radial opening 587 and at least one second radial opening 589. The first radial opening 587 may fluidly connect the passage 588 to a downstream chamber 590 cooperatively defined by the outer shell 552, the second inner wall 585, the tube 586, and the downstream wall 580. The second radial opening 589 may fluidly connect the passage 588 to an intermediate chamber 592 cooperatively defined by the outer shell 552, the first inner wall 584, the tube 586, and the second inner wall 585.

Accordingly, it will be appreciated that the downstream chamber 590, the intermediate chamber 592, and the chamber 576 may define so-called Helmholtz resonators for providing additional dampening of acoustic energy. In the embodiment illustrated, the chambers 590, 592, 576 are empty. Accordingly, the damper 500 may be a purely reactive-type damper.

Figure 7:
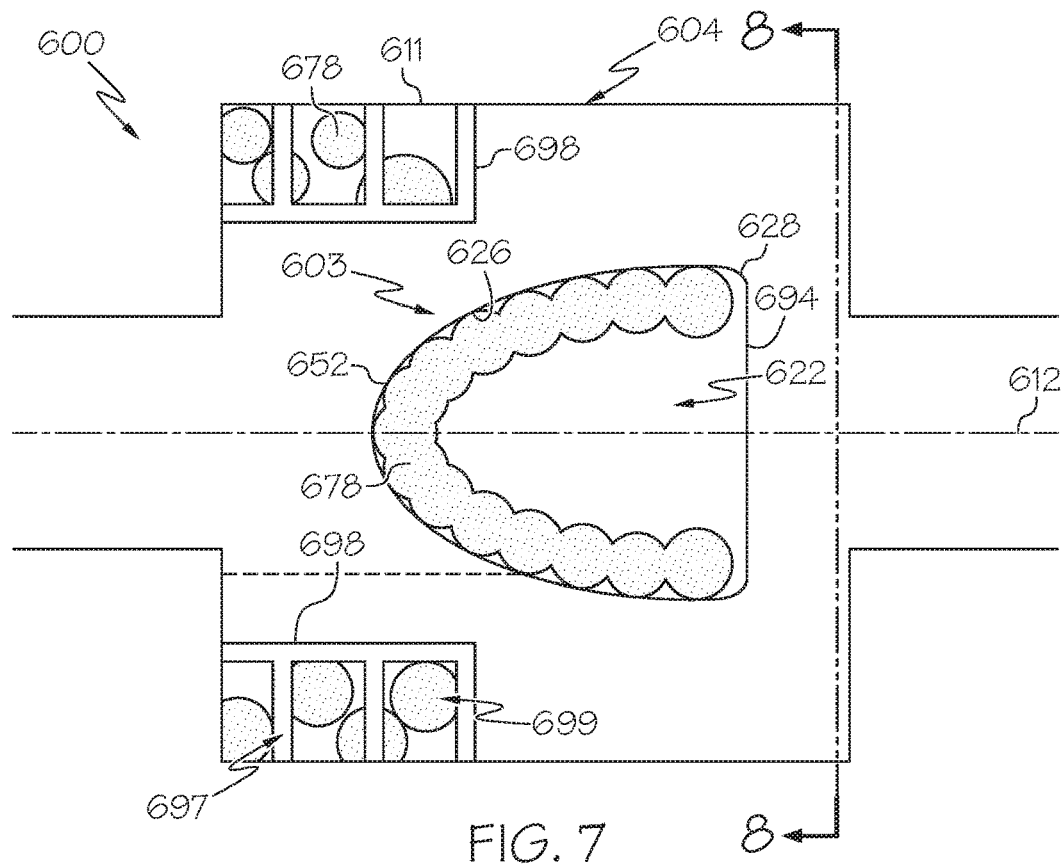
FIG. 7 is a longitudinal section view of the acoustic damper according to additional embodiments of the present disclosure.
Figure 8:
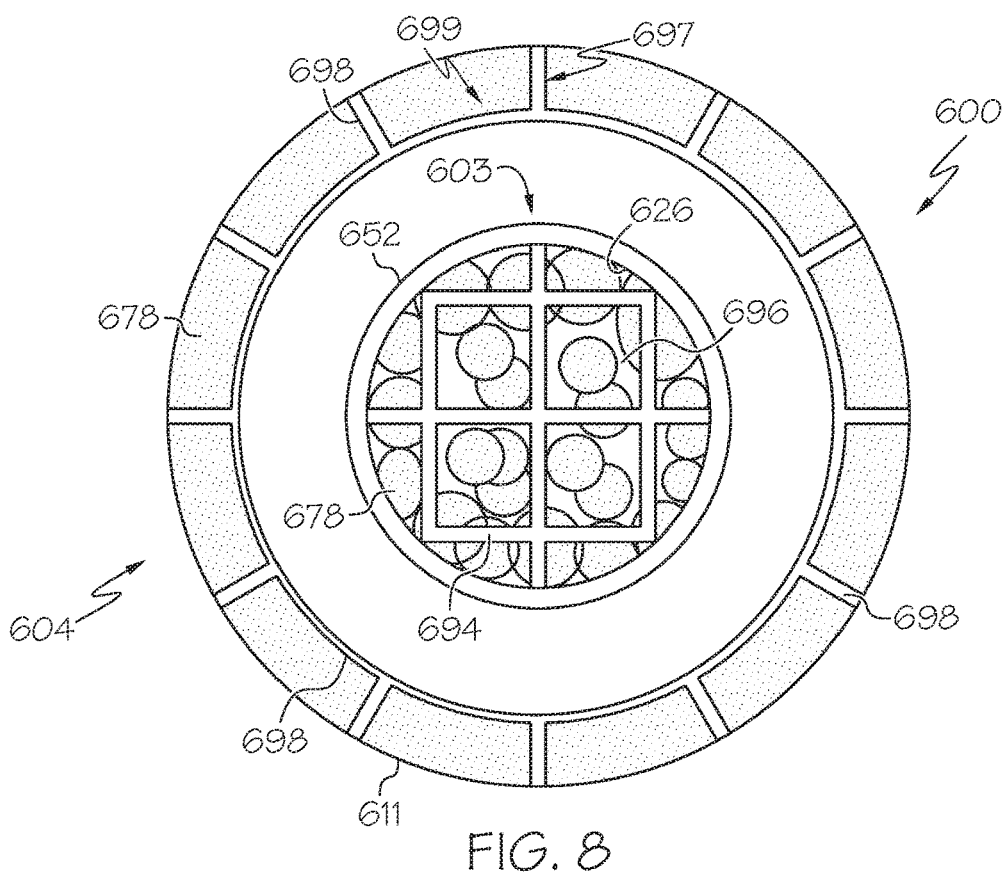
FIG. 8 is a section view of the damper taken along the line 8-8 of FIG. 7.

Referring now to FIGS. 7 and 8, the damper 600 is shown according to additional embodiments of the present disclosure. The damper 600 may be substantially similar to the embodiment of FIG. 6 (or other embodiments disclosed herein) except as detailed below. Components of the damper 600 that correspond to those of the embodiments of FIG. 6 are indicated with corresponding reference numbers increased by 100. The Damper 600 may define an axis 612.

The barrier member 603 of the damper 600 may include the outer shell 652. The outer shell 652 may define the interior volume 622. The interior volume 622 may include acoustic dampening material 678. The acoustic dampening material 678 may be attached to the interior surface 626 of the outer shell 652. The barrier member 603 may also include a plurality of elongate retainer bars 694 that extend radially across the interior volume 622. In some embodiments, the elongate retainer bars 694 may be attached at the downstream lip 628 of the barrier member 603. As shown in FIG. 8, a plurality of openings 696 may be defined between individual retainer bars 694 and between the retainer bars 694 and the outer shell 652. Accordingly, the retainer bars 694 may define a cage-like structure configured to retain the acoustic dampening material 678 within the outer shell 652. The openings 696 may allow acoustic energy to travel into the outer shell 652 for attenuation.

Moreover, the damper 600 may include a plurality of outer retainer members 698. The outer retainer members 698 may include elongate bars or other similar structure. The outer retainer members 698 may be attached to the housing 604 (e.g., to the upstream wall 608 and/or the outer radial wall 611). The outer retainer members 698 and the housing 604 may cooperate to define an annular cage-like structure 697 with a plurality of openings 699. The damper 600 may include a collection of acoustic dampening material 678 that is contained within the cage-like structure 697. The openings 699 may allow acoustic energy to propagate to the material 678 for further attenuation.

Accordingly, the damper of the present disclosure provides effective noise attenuation across a wide spectrum of acoustic frequencies. The damper can include a variety of features that decreases noise travel in the upstream direction where it can be perceived, for example, by a passenger of the vehicle. Also, the damper can provide a relatively small pressure drop for the gas flow. Moreover, the damper can include a variety of features, such as quarter wave resonators, Helmholtz resonators, acoustic dampening materials, and combinations of two or more of these features. Additionally, the damper can be relatively compact.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An acoustic damper comprising:
    a housing that includes an inlet aperture and an outlet aperture, the housing configured to receive a gas flow that enters via the inlet aperture and that exits via the outlet aperture; and
    a barrier member that is disposed within the housing, the barrier member configured to be disposed within the gas flow, the barrier member including an outer structure that defines an interior volume of the barrier member, the interior volume oriented toward and open to the outlet aperture, the barrier member configured for dampening acoustic energy that propagates in an upstream direction from the outlet aperture toward the inlet aperture;
    the outer structure containing at least one of:
        a resonator contained within the interior volume of the outer structure; and
        an acoustic dampening material contained within the interior volume of the outer structure.

2. The acoustic damper of claim 1, wherein the outer structure is an outer shell that includes an upstream end, a downstream end, and an axis that extends between the upstream end and the downstream end;
    wherein the outlet aperture is aligned with the axis of the outer shell.

3. The acoustic damper of claim 2, wherein the inlet aperture is aligned with the axis of the outer shell.

4. The acoustic damper of claim 2, wherein the outer shell is symmetrical about the axis.

5. The acoustic damper of claim 1, wherein the outer structure includes an upstream end, a downstream end, and an axis that extends between the upstream end and the downstream end; and
    wherein the outer structure has a width that increases from the upstream end to the downstream end along the axis.

6. The acoustic damper of claim 5, wherein at least part of the outer structure tapers in width along the axis.

7. The acoustic damper of claim 6, wherein the outer structure has one of a conic shape and a frusto-conic shape.

8. The acoustic damper of claim 6, wherein the outer structure has an exterior surface with three dimensional contour.

9. The acoustic damper of claim 1, wherein the outer structure contains a plurality of quarter-wave resonators that are arranged in-parallel within the interior volume.

10. The acoustic damper of claim 1, further including an acoustic dampening material that is supported by at least one of the outer structure within the interior volume and the housing.

11. The acoustic damper of claim 1, wherein the inlet aperture defines an inlet cross sectional area;
    wherein a flow cross sectional area is defined between the barrier member and the housing;
    wherein the barrier member defines an upstream end, a downstream end, and a length measured from the upstream end to the downstream end; and
    wherein the flow cross sectional area is at least equal to the inlet cross sectional area along an entirety of the length of the barrier member.

12. The acoustic damper of claim 1, wherein the outer structure is an outer shell that includes an upstream end, a downstream end, and an axis that extends between the upstream end and the downstream end;
    wherein the downstream end terminates at a downstream lip;
    wherein the outer structure contains a plurality of resonators including a first resonator with a first free end and a second resonator with a second free end; and
    wherein the first free end and the second free end terminate in a common radial plane with the downstream lip, the common radial plane extending radially with respect to the axis.

13. The acoustic damper of claim 1, wherein the outer structure is an outer shell that includes an upstream end, a downstream end, and an axis that extends between the upstream end and the downstream end;
    wherein the outer structure contains a plurality of resonators surrounding the axis, the plurality of resonators having different radii, and the plurality of resonators spaced apart at a consistent radial distance between adjacent ones of the plurality of resonators.

14. The acoustic damper of claim 1, wherein the outer structure includes an upstream end, a downstream end, and an axis that extends between the upstream end and the downstream end; and
    wherein the upstream end includes a projection extending along the axis toward the inlet aperture.

15. The acoustic damper of claim 1, wherein the outer structure includes an upstream end, a downstream end, and an axis that extends between the upstream end and the downstream end; and
   wherein the downstream end is contoured inward radially toward the axis.

16. An acoustic damper comprising:
   a housing that includes an inlet aperture and an outlet aperture, the housing configured to receive a gas flow that enters via the inlet aperture and that exits via the outlet aperture;
   a barrier member that is disposed within the housing, the barrier member configured to be disposed within the gas flow, the barrier member including an outer structure that defines an interior volume of the barrier member, the interior volume oriented toward the outlet aperture, the barrier member configured for dampening acoustic energy that propagates in an upstream direction generally from the outlet aperture toward the inlet aperture; and
   the barrier member including at least one resonator disposed within the interior volume, the at least one resonator including at least one inner wall that is connected to the outer structure and that defines a chamber within the interior volume;
   wherein the at least one inner wall includes an opening; and
   wherein the at least one inner wall, the opening, and the chamber are configured to define a Helmholtz-type resonator.

17. An acoustic damper comprising:
   a housing that includes an inlet aperture and an outlet aperture, the housing configured to receive a gas flow that enters via the inlet aperture and that exits via the outlet aperture;
   an outer shell that is disposed within the housing and configured to be disposed within the gas flow, the outer shell including an upstream end, a downstream end, and an axis that extends between the upstream end and the downstream end, the outer shell having an outer width that is measured perpendicular to the axis, the outer width gradually increasing from the upstream end to the downstream end along the axis, the outer shell defining an interior volume, the downstream end including an opening into the interior volume;
   at least one resonator that is supported by the outer shell within the interior volume, the at least one resonator including at least one inner wall that is connected to the outer shell and that defines a chamber within the interior volume, the at least one inner wall including an opening; and
   the at least one inner wall, the opening, and the chamber being configured to define a Helmholtz-type resonator.

18. The acoustic damper of claim 17, wherein the at least one resonator includes a plurality of Helmholtz-type resonators.

19. The acoustic damper of claim 17, further including an acoustic dampening material that is supported by at least one of the outer shell within the interior volume and the housing.

20. The acoustic damper of claim 17, wherein the outlet aperture is aligned with the axis of the barrier member.

* * * * *